US012775229B2

(12) United States Patent
Iriyama et al.

(10) Patent No.: US 12,775,229 B2
(45) Date of Patent: Oct. 27, 2026

(54) FIXING DEVICE

(71) Applicant: BROTHER KOGYO KABUSHIKI KAISHA, Nagoya (JP)

(72) Inventors: Shota Iriyama, Toyokawa (JP); Yasuhiro Hosokawa, Niwa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 19/058,537

(22) Filed: Feb. 20, 2025

(65) Prior Publication Data

US 2025/0278041 A1 Sep. 4, 2025

(30) Foreign Application Priority Data

Feb. 29, 2024 (JP) ................................ 2024-029977
Feb. 29, 2024 (JP) ................................ 2024-029982

(51) Int. Cl.
*G03G 15/20* (2006.01)
*G03G 21/16* (2006.01)

(52) U.S. Cl.
CPC ..... *G03G 15/2028* (2013.01); *G03G 15/2039* (2013.01); *G03G 15/2064* (2013.01); *G03G 21/1647* (2013.01); *G03G 2221/1639* (2013.01)

(58) Field of Classification Search
CPC ........... G03G 15/2028; G03G 15/2039; G03G 15/2064; G03G 21/1647; G03G 21/1652; G03G 21/1685; G03G 2221/1639
See application file for complete search history.

(56) References Cited

U.S. PATENT DOCUMENTS

2012/0251138 A1 10/2012 Ishida et al.
2012/0251207 A1* 10/2012 Ishida ................ G03G 15/2039 399/329
2016/0378055 A1* 12/2016 Takemoto ..................... 399/122
2021/0223724 A1 7/2021 Imada

FOREIGN PATENT DOCUMENTS

JP 2012-212065 A 11/2012
JP 2021-113967 A 8/2021

* cited by examiner

*Primary Examiner* — Sophia S Chen
(74) *Attorney, Agent, or Firm* — Scully, Scott, Murphy & Presser, P. C.

(57) ABSTRACT

A fixing device includes a heating member, a pressure member, a first side frame, a second side frame, a connection frame, an external connector, a first temperature sensor, a second temperature sensor, an intermediate circuit board, a first cable, a second cable, and a third cable. The fixing device is installable into a main housing of an image forming apparatus. The heating member and the pressure member are configured to nip a sheet therebetween. The connection frame connects the first side frame and the second side frame. The intermediate circuit board is configured to relay signals from the first temperature sensor and the second temperature sensor to the external connector. The first cable connects the first temperature sensor and the intermediate circuit board. The second cable connects the second temperature sensor and the intermediate circuit board. The third cable connects the intermediate circuit board and the external connector.

20 Claims, 14 Drawing Sheets

LONGITUDINAL DIRECTION

ONE SIDE ⟷ OTHER SIDE

FIXING DEVICE

REFERENCE TO RELATED APPLICATIONS

This application claims priority from Japanese Patent Application Nos. 2024-029977 and 2024-029982 filed on Feb. 29, 2024. The entire contents of the priority applications are incorporated herein by reference.

BACKGROUND ART

A fixing device installable into and removable from a main housing of an image forming apparatus is known in the art. Such a fixing device includes a heating member, side frames, an external connector, a plurality of sensors and an intermediate circuit board. The heating member includes a heating source. The side frames are located on both sides of the heating member and are connected by an exterior member made of plastic. The external connector transmits signals to the image forming apparatus. The signals from the plurality of sensors are relayed to the external connector by the intermediate circuit board. The intermediate circuit board is located frontward of the heating member and adjacent to the heating member and to the external connector. The intermediate circuit board is held by a retainer fixed to the exterior member.

SUMMARY

When an intermediate circuit board is located adjacent to an external connector, the cables connecting sensors to the intermediate circuit board may become longer depending on the positions of the sensors, making wiring complicated.

It would be desirable to make the cables connecting the sensors to the intermediate circuit board shorter and simplify the wiring.

In one aspect, the fixing device comprises a heating member, a pressure member, a first side frame, a second side frame, a connection frame, an external connector, a first temperature sensor, a second temperature sensor, an intermediate circuit board, a first cable, a second cable and a third cable. The fixing device is installable into a main housing of an image forming apparatus.

The heating member extends in a longitudinal direction and comprises a heater.

The pressure member extends in the longitudinal direction and nips a sheet in combination with the heating member.

The first side frame is located on one side in the longitudinal direction with respect to the heating member.

The second side frame is located on the other side in the longitudinal direction with respect to the heating member.

The connection frame extends in the longitudinal direction and connects the first side frame and the second side frame.

The external connector is connectable to the main housing.

The first temperature sensor detects a temperature of the heating member.

The second temperature sensor detects a temperature of the heating member.

The intermediate circuit board relays a signal from the first temperature sensor to the external connector and relays a signal from the second temperature sensor to the external connector.

The first cable connects the first temperature sensor and the intermediate circuit board.

The second cable connects the second temperature sensor and the intermediate circuit board.

The third cable connects the intermediate circuit board and the external connector.

Since the wiring of the sensors is brought together at the intermediate circuit board and then connected to the external connector, wiring can be simplified if the sensors are located on the one side in the longitudinal direction with respect to a longitudinal center of the heating member.

The external connector may be located on the other side in the longitudinal direction with respect to the longitudinal center of the heating member, and a longitudinal center of the intermediate circuit board may be located on the one side in the longitudinal direction with respect to the longitudinal center of the heating member.

Since the longitudinal center of the intermediate circuit board is located on the one side in the longitudinal direction with respect to the longitudinal center of the heating member, the cables connecting the sensors and the intermediate circuit board can be made shorter if the sensors are located on the one side in the longitudinal direction with respect to the longitudinal center of the heating member.

An edge of the intermediate circuit board on the other side in the longitudinal direction may be located on the one side in the longitudinal direction with respect to the longitudinal center of the heating member.

Since the edge of the intermediate circuit board on the other side in the longitudinal direction is located on the one side in the longitudinal direction with respect to the longitudinal center of the heating member, the cables connecting the sensors and the intermediate circuit board can be made shorter if the sensors are located on the one side in the longitudinal direction with respect to the longitudinal center of the heating member.

An edge of the intermediate circuit board on the one side in the longitudinal direction may be closer, than an edge of the heating member on the one side in the longitudinal direction, to the longitudinal center of the heating member.

Since the edge of the intermediate circuit board on the one side in the longitudinal direction is closer, than an edge of the heating member on the one side in the longitudinal direction, to the longitudinal center of the heating member, i.e., since the intermediate circuit board is located within a longitudinal area in which the heating member is located, interference of the intermediate circuit board with a structure on an end of the fixing device on the one side in the longitudinal direction can be restrained.

The first temperature sensor may be located within a longitudinal area through which a sheet having a minimum width fixable in the fixing device passes, and the second temperature sensor may be located outside a longitudinal area through which a sheet having a maximum width fixable in the fixing device passes.

The first temperature sensor may be located between one end and the other end of the intermediate circuit board in the longitudinal direction, and the second temperature sensor may be located on the one side in the longitudinal direction with respect to an edge of the intermediate circuit board on the one side in the longitudinal direction.

Further, in order to increase the rigidity of the fixing device, it would be desirable to connect the side frames of the fixing device by a metal frame. However, if the intermediate circuit board is disposed on the metal frame, the intermediate circuit board would be susceptible to the heat from the heating element.

Thus, it would be desirable to increase the rigidity of the fixing device and to make the intermediate circuit board less susceptible to the heat from the heating member.

In light of the above, the connection frame may be made of metal and located between the intermediate circuit board and the heating member, and a first frame made of plastic may be provided between the intermediate circuit board and the connection frame.

By connecting the pair of side frames by a connection frame made of metal, the rigidity of the fixing device can be increased. Further, even if the connection frame is located between the intermediate circuit board and the heating member, the intermediate circuit board is less susceptible to the heat from the heating member because the first frame made of plastic is provided between the intermediate circuit board and the connection frame.

The intermediate circuit board may be located above the heating member.

Since the intermediate circuit board is located above the heating member, the dimension of the fixing device in the front-rear direction can be made smaller than that of a fixing device of an alternative configuration in which the intermediate circuit board is located frontward or rearward of the heating member.

The first temperature sensor may be located above the heating member.

The first temperature sensor may be held by the connection frame.

The first frame may comprise a base wall opposed to the intermediate circuit board, and a support wall extending from the base wall toward the intermediate circuit board to support the intermediate circuit board with a space being formed between the intermediate circuit board and the base wall.

Since the support wall supports the intermediate circuit board with a space being formed between the intermediate circuit board and the base wall, a layer of air can block the heat of the heating member from the intermediate circuit board.

The first frame may hold the third cable.

Since the first frame supports the third cable, the third cable can be protected from contact with the connection frame.

A second frame made of plastic may be provided between the first frame and the connection frame.

Since a second frame made of plastic is provided between the first frame and the connection frame, the heat of the heating member can be doubly blocked from the intermediate circuit board.

The fixing device may further comprise a first power cable that connects the external connector and one end of the heater on the one side in the longitudinal direction. The external connector may be located on the other side in the longitudinal direction with respect to a longitudinal center of the heating member. The first power cable may extend between the first frame and the second frame.

Since the first power cable extends between the first frame and the second frame, the power cable can be protected from contact with the connection frame.

The external connector may be located outward of the second side frame in the longitudinal direction.

Since the external connector is located outward of the second side frame in the longitudinal direction, interference of the external connector with the sheet can be restrained.

The fixing device may further comprise a connector holder that holds the external connector. The connector holder may extend from one side to the other side of the second side frame in the longitudinal direction and include a cable holder that holds the third cable.

Since the connector holder extends from one side to the other side of the second side frame in the longitudinal direction and holds the third cable, the third cable can be restrained from contacting the second side frame.

The fixing device may further comprise a cover that covers the intermediate circuit board.

Since the fixing device comprises the cover, the intermediate circuit board can be protected.

The cover may include a vent hole located above the intermediate circuit board.

Since the cover includes a vent hole located above the intermediate circuit board, air in the fixing device can be discharged through the vent hole.

The fixing device may further comprise a sheet sensor located on the one side in the longitudinal direction with respect to a longitudinal center of the heating member and configured to detect a sheet that has passed through between the heating member and the pressure member, and a fourth cable that connects the sheet sensor and the intermediate circuit board.

Since the sheet sensor is located on the one side in the longitudinal direction with respect to the longitudinal center of the heating member, the fourth cable connecting the sheet sensor and the intermediate circuit board can be made shorter.

The fixing device may further comprise a pressure changing mechanism that comprises a cam and is configured to change a nip pressure between the heating member and the pressure member, a cam sensor located on the one side in the longitudinal direction with respect to a longitudinal center of the heating member and configured to detect a phase of the cam, and a fifth cable that connects the cam sensor and the intermediate circuit board.

Since the cam sensor is located on the one side in the longitudinal direction with respect to the longitudinal center of the heating member, the fifth cable that connects the cam sensor and the intermediate circuit board can be made shorter.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
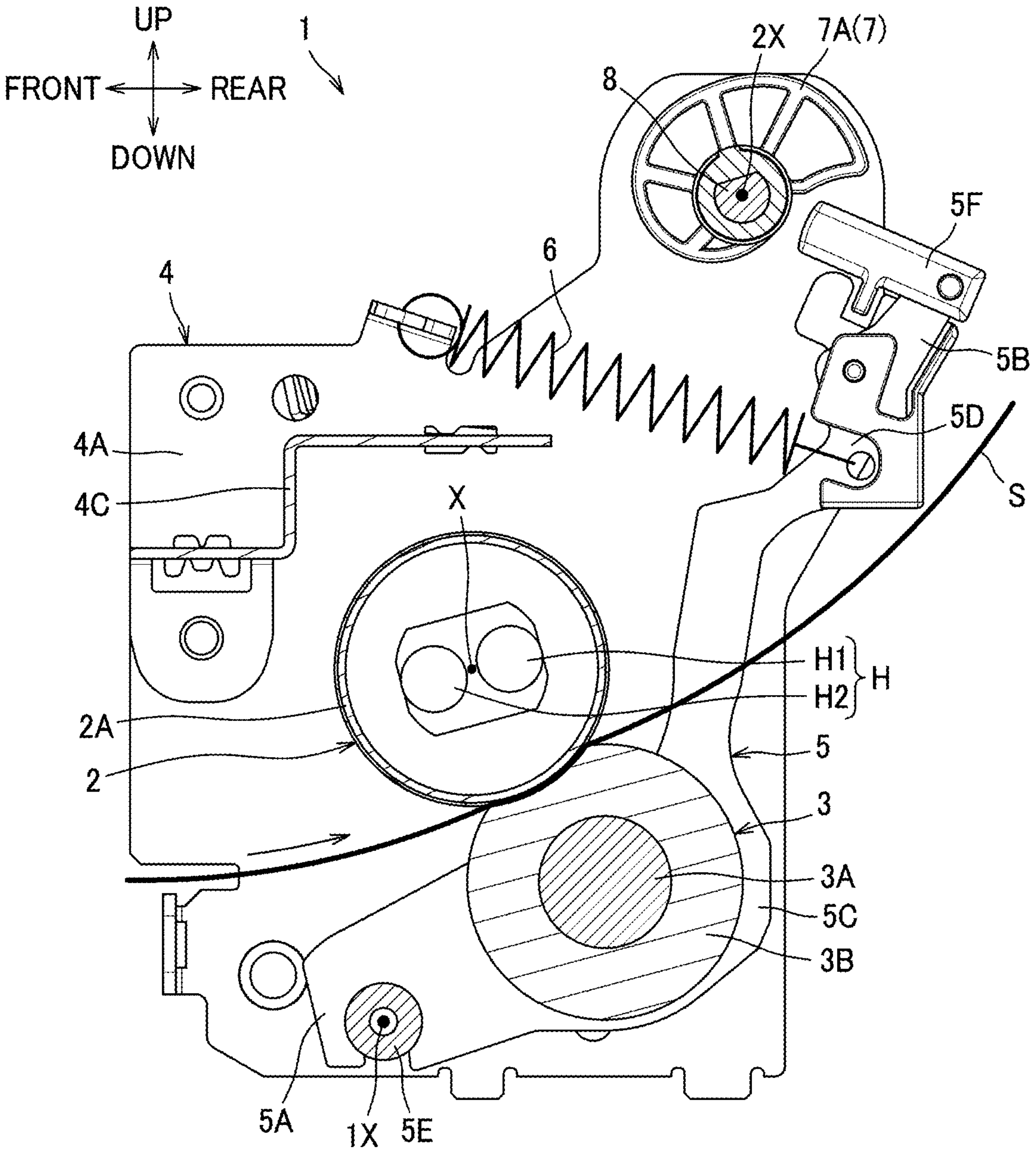
FIG. 1 is a cross sectional view of a fixing device showing a cam located in a first phase.

An embodiment of the present disclosure will be described in detail referring to the drawings where appropriate.

As shown in FIG. 1, a fixing device 1 is a device for fixing a toner image onto a sheet S. The fixing device 1 is installable into a main housing M of an image forming apparatus P such as a printer (see FIG. 14). The fixing device 1 comprises a heating roller 2 as an example of a heating member, a pressure roller 3 as an example of a pressure member, a fixing frame 4, an arm 5, a spring 6 and a cam 7.

The heating roller 2 extends in a longitudinal direction and rotates about a rotation axis X. The heating roller 2 receives a driving force from a motor (not shown) provided in the image forming apparatus P and rotates. The heating roller 2 comprises a roller 2A and a heater H. In this embodiment, the heating roller 2 comprises two heaters H1, H2. The roller 2A is a metal tube heated by the heater H. The heater H is located inside the roller 2A. The heater H is, for example, a halogen heater.

A central portion CL1 of the heating roller 2 in the longitudinal direction (longitudinal center CL1 of the heating roller 2) is a central portion of a longitudinal area through which a sheet $S_{max}$ having a maximum width fixable in the fixing device 1 passes.

In the following description, the longitudinal direction in which the heating roller 2 extends is simply referred to as "longitudinal direction". The longitudinal direction is also the direction in which the rotation axis X of the heating roller 2 extends. One side in the longitudinal direction corresponds to the right side of the fixing device 1, and the other side in the longitudinal direction corresponds to the left side of the fixing device 1 as viewed in the direction in which the fixing device 1 is installed into the main housing M.

The direction in which the fixing device 1 is installed into the main housing M is referred to as "installation direction" and the direction in which the fixing device 1 is removed from the main housing M is referred to as "removal direction". The installation direction and the removal direction respectively correspond to frontward and rearward of the main housing M. The installation direction and the removal direction are collectively referred to as installation-removal direction. The front-rear direction and the up-down direction of the fixing device correspond to the front-rear direction and the up-down direction of the main housing M in a state where the fixing device 1 is installed in the main housing M. The sheet S is conveyed from the front toward the rear of the fixing device 1 and passes through the fixing device 1. The sheet S that has passed through the fixing device 1 is conveyed upward with respect to the fixing device.

The pressure roller 3 extends in the longitudinal direction. The pressure roller 3 rotates in accordance with the heating roller 2 and nips the sheet S with the heating roller 2. The pressure roller 3 comprises a shaft 3A and a roller body 3B. The shaft is, for example, made of metal. The roller body 3B is, for example, made of rubber and covers an outer periphery of the shaft 3A.

Figure 3:
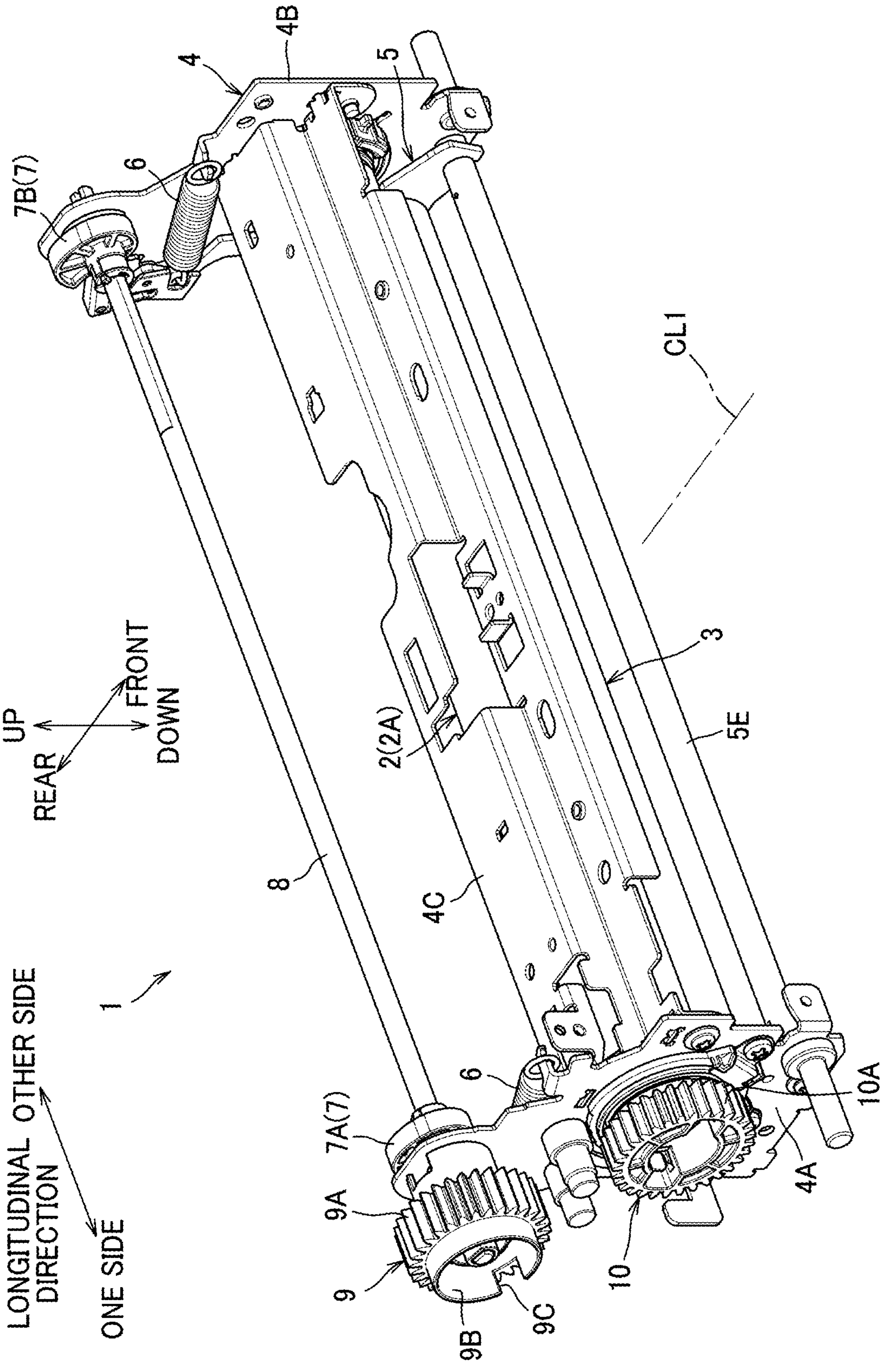
FIG. 3 is a perspective view of a fixing frame.

As shown in FIG. 3, the fixing frame 4 comprises a first side frame 4A, a second side frame 4B and a connection frame 4C. The first side frame 4A is located on the one side in the longitudinal direction with respect to the heating roller 2 and the pressure roller 3, and the second side frame 4B is located on the other side in the longitudinal direction with respect to the heating roller 2 and pressure roller 3. The first side frame 4A and the second side frame 4B support the heating roller 2 in a manner that allows the heating roller 2 to rotate.

The connection frame 4C is a metal plate extending in the longitudinal direction. The connection frame 4C connects the first side frame 4A and the second side frame 4B. The first side frame 4A, the second side frame 4B and the connection frame 4C may be formed integrally as one part.

The cam 7 includes a cam 7A and a cam 7B. The cam 7A is located in the vicinity of the first side frame 4A. The cam 7B is located in the vicinity of the second side frame 4B. The cam 7A and the cam 7B are connected by a cam shaft 8. The cam shaft 8 is rotatably supported by the first side frame 4A and the second side frame 4B.

Referring back to FIG. 1, the arm 5, the spring 6 and the cam 7 form a pressure changing mechanism for changing a nip pressure between the heating roller 2 and the pressure roller 3. The pressure changing mechanism is capable of changing the nip pressure by moving at least one of the heating roller 2 and the pressure roller 3 relative to the other of the heating roller 2 and the pressure roller 3. In the present embodiment, the pressure changing mechanism changes the nip pressure by moving the pressure roller 3 relative to the heating roller 2.

The arm 5 has a first end 5A, a second end 5B, a first portion 5C and a second portion 5D. The arm 5 is rotatable about an arm axis 1X.

The first end 5A is rotatably supported by the first side frame 4A via a shaft 5E. The second end 5B comprises a cam follower 5F. The cam follower 5F is contactable with the cam 7.

The first portion 5C and the second portion 5D are located between the first end 5A and the second end 5B. The first portion 5C supports the pressure roller 3. The second portion 5D is a portion to which the spring 6 is connected. One end of the spring 6 is hooked on the second portion 5D and the other end of the spring 6 is hooked on the first side frame 4A. The spring 6 causes the pressure roller 3 to be pressed against the heating roller 2 via the arm 5.

Figure 2:
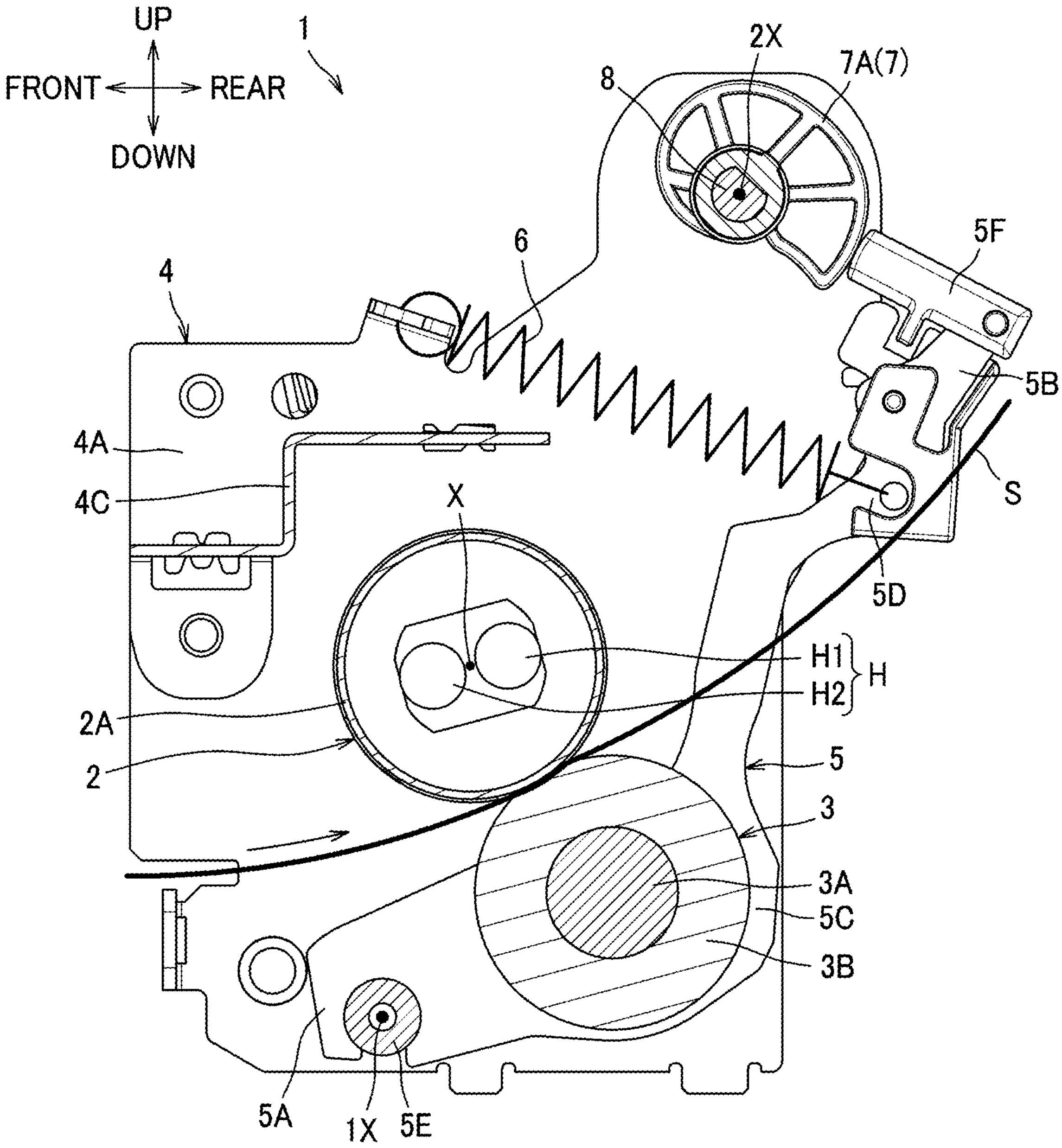
FIG. 2 is a cross sectional view of the fixing device showing the cam located in a second phase.

The cam 7A is rotatably supported by the first side frame 4A via the cam shaft 8 and is rotatable about a cam axis 2X. Rotation of the cam 7A causes the pressure roller 3 to move to change the nip pressure for nipping the sheet S. The cam 7 is rotatable between a first phase shown in FIG. 1 and a second phase shown in FIG. 2.

The first phase is a phase in which the nip pressure assumes a first nip pressure. The second phase is a phase in which the nip pressure assumes a second nip pressure lower than the first nip pressure. The cam 7A is rotatable from the first phase shown in FIG. 1 to the second phase shown in FIG. 2 by rotating in the counterclockwise direction.

The arm 5, the spring 6 and the cam 7B provided on the second side frame 4B have structures symmetrical to the arm 5, the spring 6 and the cam 7A provided on the first side frame 4A. Thus, a detailed description of the arm 5, the spring 6 and the cam 7B provided on the second side frame 4B will be omitted.

As shown in FIG. 3, the fixing device 1 further comprises a cam gear 9 and a fixing gear 10. The cam gear 9 is fixed to an end of the cam shaft 8 on the one side in the longitudinal direction.

The cam gear 9 is connected to the cam 7 via the cam shaft 8 and transmits a driving force to the cam 7. The cam gear 9 includes gear teeth 9A and a flange 9B extending from the vicinity of the roots of the gear teeth 9A toward the one side in the longitudinal direction. The flange 9B has a notch 9C for detecting the phase of the cam 7.

The fixing gear 10 includes gear teeth 10A. The fixing gear 10 is fixed to an end of the roller 2A on the one side in the longitudinal direction. The fixing gear 10 is coaxial with the heating roller 2 and rotates together with the heating roller 2 about the rotation axis X. The fixing gear 10 transmits a driving force to the heating roller 2.

Figure 4:
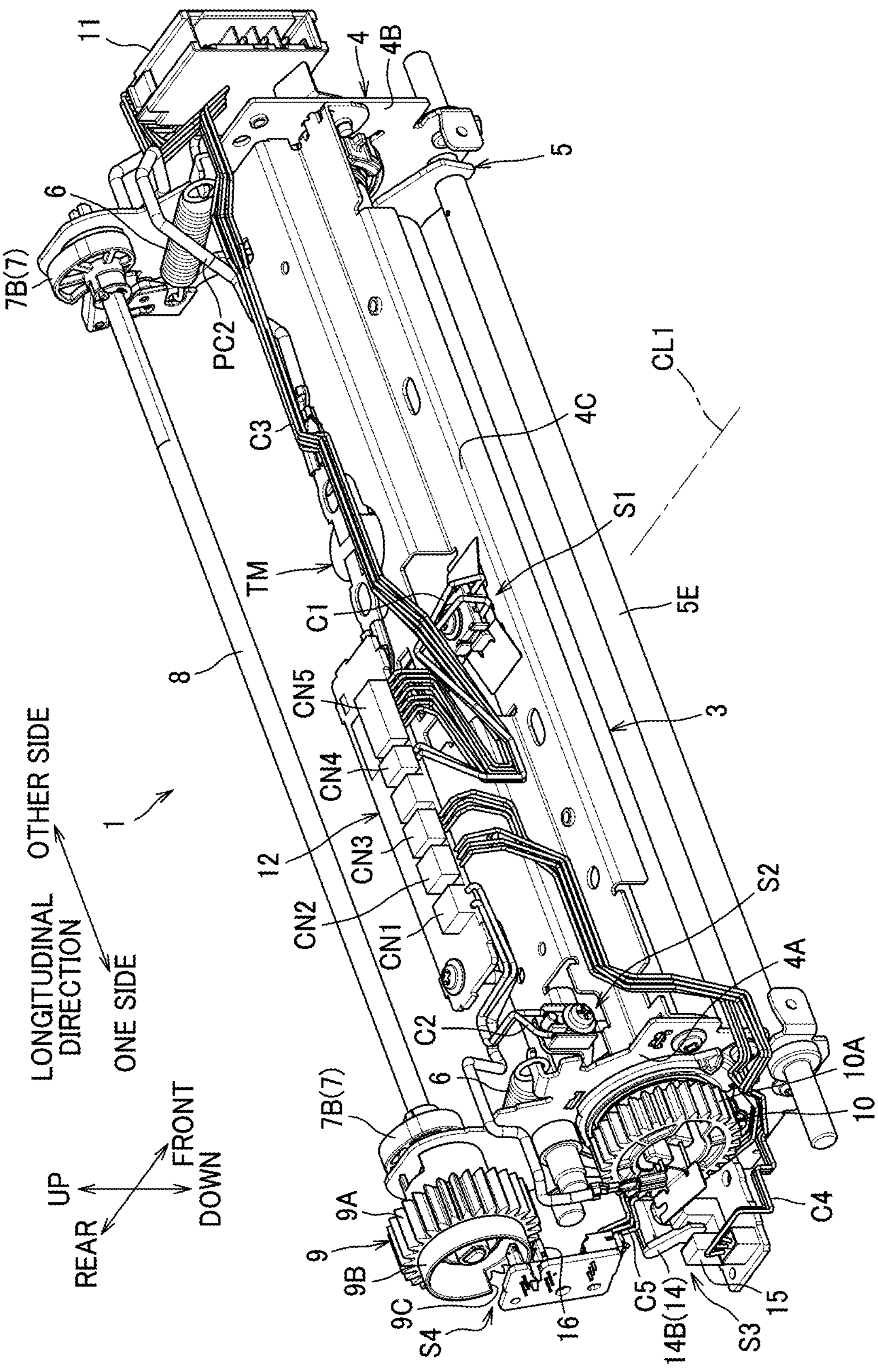
FIG. 4 is a perspective view showing an arrangement of an intermediate circuit board, sensors, cables and a fixing connector relative to the fixing frame.
Figure 5:
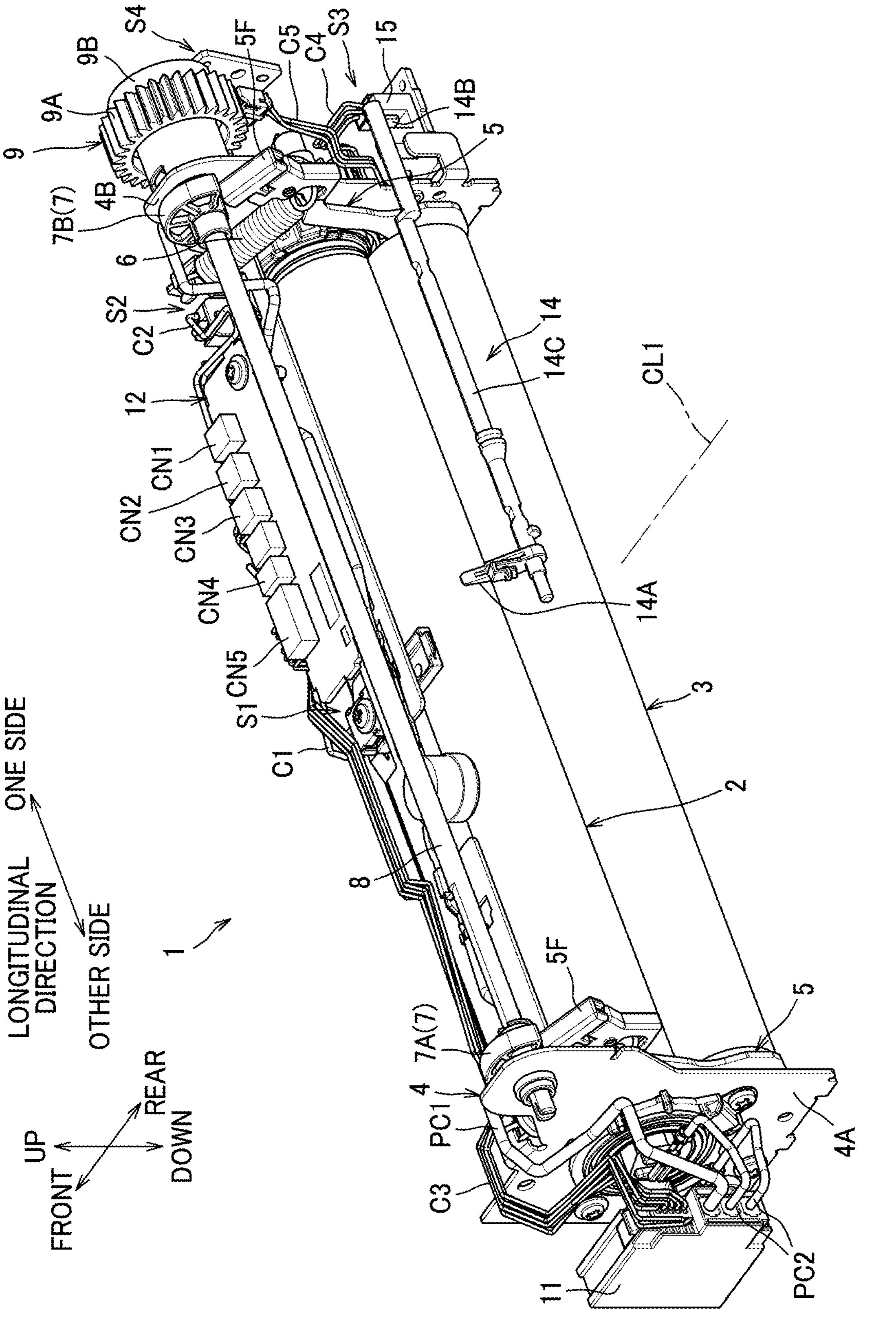
FIG. 5 is a perspective view of the fixing frame shown in FIG. 4 as viewed in a direction of installation of the fixing device.

As shown in FIGS. 4 and 5, the fixing device 1 further comprises a first temperature sensor S1, a second temperature sensor S2, a sheet sensor S3, a cam sensor S4, a fixing connector 11 as an external connector and an intermediate circuit board 12.

The first temperature sensor S1 detects a temperature of the heating roller 2. The first temperature sensor S1 is spaced apart from the heating roller 2. The first temperature sensor S1 is retained on the connection frame 4C by screws or the like. The first temperature sensor S1 is located above the heating roller 2. The first temperature sensor S1 is, for example, a thermistor.

The second temperature sensor S2 detects a temperature of the heating roller 2. The second temperature sensor S2 is in contact with the heating roller 2. The second temperature sensor S2 is retained on the connection frame 4C by screws or the like. The second temperature sensor S2 is, for example, a thermistor.

The sheet sensor S3 detects a sheet S that has passed through between the heating roller 2 and the pressure roller 3. The sheet sensor S3 comprises a rotation member 14 and an optical sensor 15. The rotation member 14 rotates upon contact with the sheet S.

The optical sensor 15 comprises a light emitting element that emits light and a light receiving element that receives light from the light emitting element. The optical sensor 15 emits light from the light emitting element along the longitudinal direction.

The rotation member 14 comprises a first lever 14A, a second lever 14B and a shaft 14C. The first lever 14A is contactable with the sheet S. The second lever 14B can block light of the optical sensor 15. The shaft 14C connects the first lever 14A and the second lever 14B. The rotation member 14 is rotatable about the shaft 14C.

In a state where the rotation member 14 is not in contact with a sheet S as shown in FIGS. 4 and 5, light of the optical sensor 15 is blocked by the second lever 14B of the rotation member 14. The rotation member 14 rotates when the first lever 14A is pushed by a sheet S. As a result, the second lever 14B moves out of the light path of the optical sensor 15. Thus, it can be determined that a sheet is not passing through between the heating roller 2 and the pressure roller 3 if the light receiving element of the optical sensor 15 is not receiving light, and that a sheet is passing through between the heating roller 2 and the pressure roller 3 if the light receiving element of the optical sensor 15 is receiving light.

The cam sensor S4 detects the phase of the cam 7. The cam sensor S4 comprises an optical sensor 16.

The optical sensor 16 comprises a light emitting element that emits light and a light receiving element that receives light from the light emitting element. The optical sensor 16 emits light from the light emitting element along the up-down direction.

In a state where the cam 7 is located in the first phase as shown in FIG. 4, light of the optical sensor 16 is blocked by the flange 9B of the cam gear 9. After the cam 7 rotates to the second phase, the light receiving portion of the optical sensor 16 is able to receive light through the notch 9C formed in the flange 9B of the cam gear 9. Thus, it can be determined that the cam 7 is located in the second phase if the light receiving element of the optical sensor 16 is receiving light, and that the cam is located in a phase other than the second phase if the light receiving element of the optical sensor 16 is not receiving light.

The fixing connector 11 is connectable to the main housing M in a state where the fixing device 1 is installed in the main housing M. In more detail, the fixing connector 11 is connectable to a housing connector 18 (see FIG. 14) provided at the main housing M in a state where the fixing device 1 is installed in the main housing M. The fixing connector 11 is located outside of the first side frame 4A and the second side frame 4B in the longitudinal direction. In more detail, the fixing connector 11 is located outside of the second side frame 4B.

The intermediate circuit board 12 relays signals from the first temperature sensor S1, the second temperature sensor S2, the sheet sensor S3 and the cam sensor S4 to the fixing connector 11. The intermediate circuit board 12 comprises a second temperature sensor connector CN1, a sheet sensor connector CN2, a cam sensor connector CN3, a first temperature sensor connector CN4, and a relay connector CN5. The second temperature sensor connector CN1, the sheet sensor connector CN2, the cam sensor connector CN3, the first temperature sensor connector CN4, and the relay connector CN5 are internal connectors.

Figure 6:
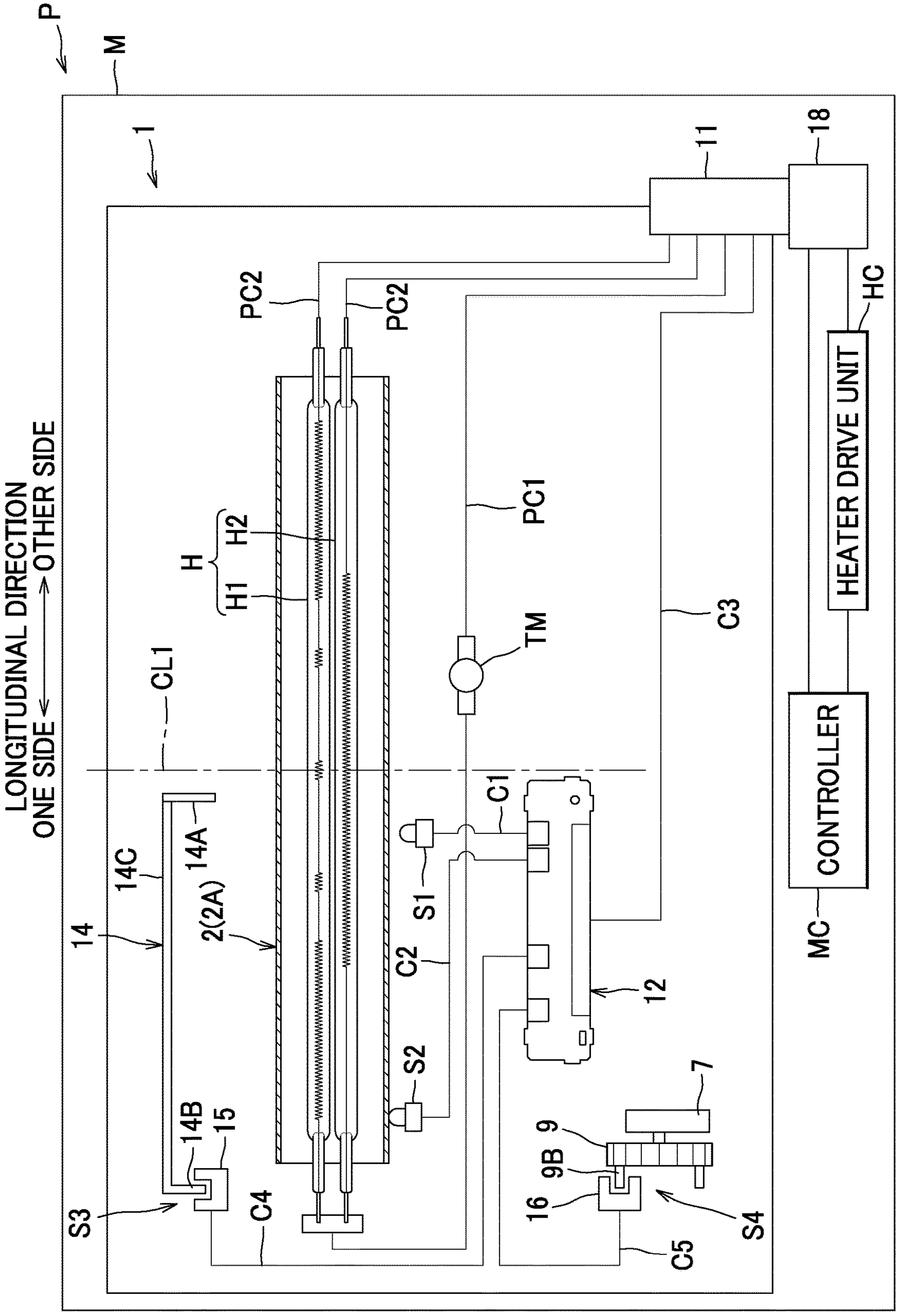
FIG. 6 is an illustration showing wiring between a heater, the sensors, the intermediate circuit board and the fixing connector.

As shown in FIG. 6, the intermediate circuit board 12 is connected to the first temperature sensor S1 by a first cable C1. The intermediate circuit board 12 is connected to the second temperature sensor S2 by a second cable C2. The intermediate circuit board 12 is connected to the fixing connector 11 by a third cable C3. Further, the intermediate circuit board 12 is connected to the sheet sensor S3 by a fourth cable C4 and to the cam sensor S4 by a fifth cable C5.

The heaters H1, H2 of the heating roller 2 are connected to the fixing connector 11 at the one side in the longitudinal direction by a first power cable PC1. In more detail, the heaters H1, H2 are connected to the fixing connector 11 by the power cable PC1 through a thermostat TM. The heaters H1, H2 are connected to the fixing connector 11 at the other side in the longitudinal direction by second power cables PC2, PC2. The thermostat TM shuts down power to the heaters H1, H2 when the temperature of the heating roller 2 exceeds a controllable range and becomes overheated.

In FIG. 6, the fixing device 1 is installed in the main housing M. In a state where the fixing device 1 is installed in the main housing M, the fixing connector 11 is connected to the housing connector 18. When the fixing connector 11 and the housing connector 18 are connected, temperature information detected by the temperature sensors S1, S2, sheet information detected by the sheet sensor S3 and the phase of the cam 7 detected by the cam sensor S4 can be transmitted to a controller MC of the image forming apparatus P. Further, when the fixing connector 11 and the housing connector 18 are connected, power can be supplied to the heater H from a heater drive unit HC of the main housing M. The heater drive unit HC is controlled by the controller MC and supplies power to the heater H based on the temperature information detected by the temperature sensors S1, S2.

Figure 7:
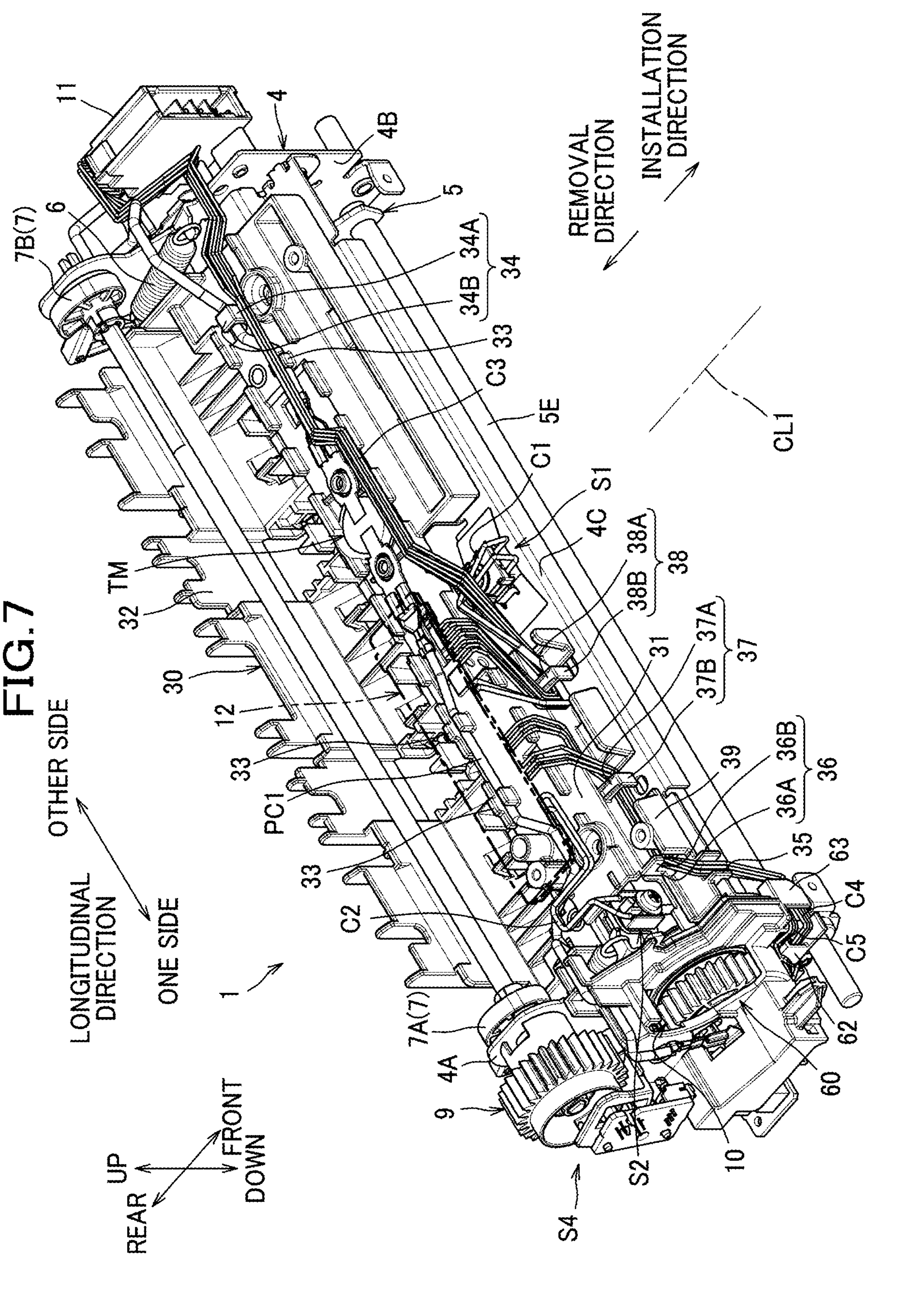
FIG. 7 is a perspective view showing a rear guide placed on the fixing frame shown in FIG. 4 and showing the intermediate circuit board by a dashed-double dotted line.
Figure 8:
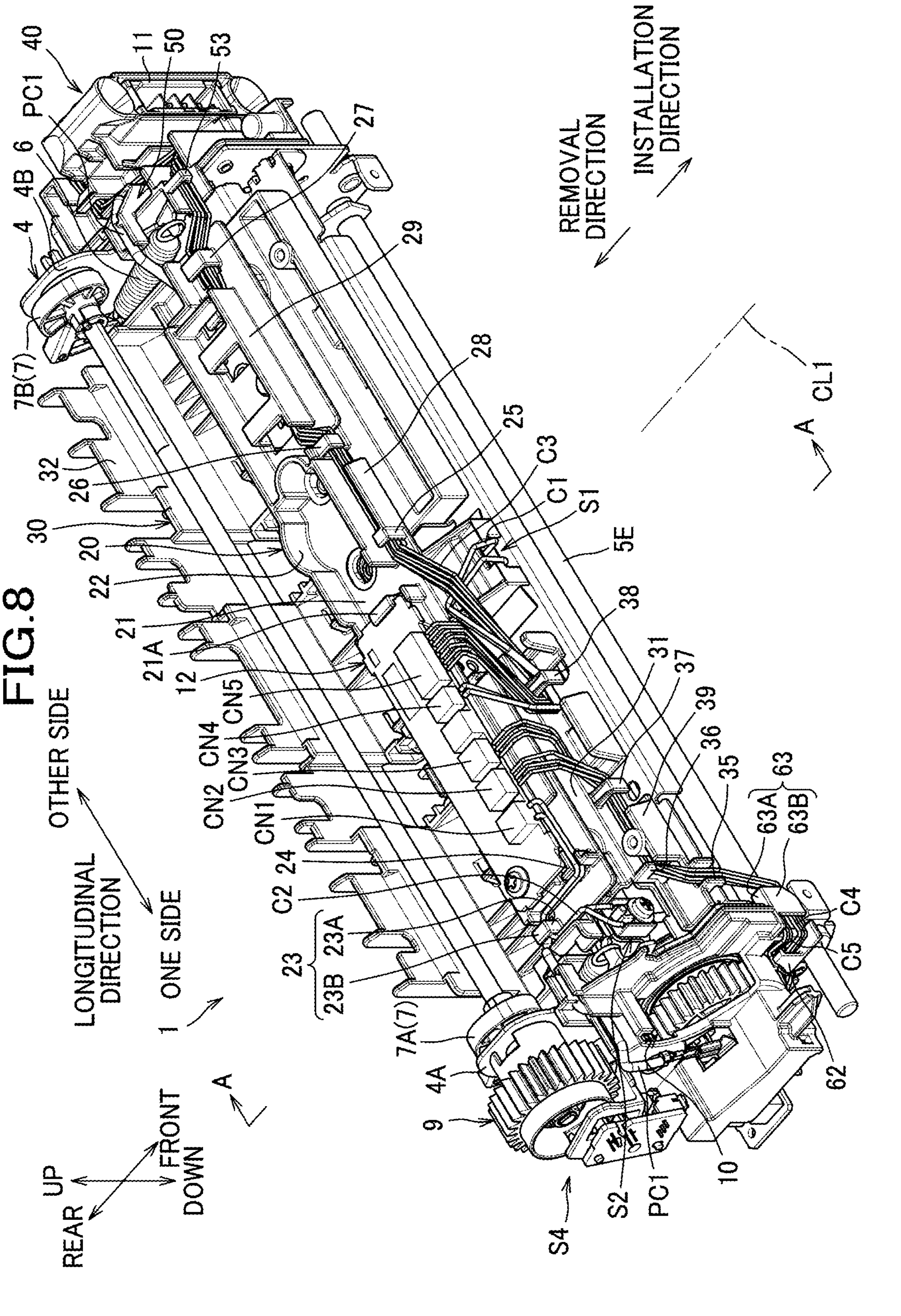
FIG. 8 is a perspective view showing a first cable holder placed on the rear guide shown in FIG. 7.
Figure 9:
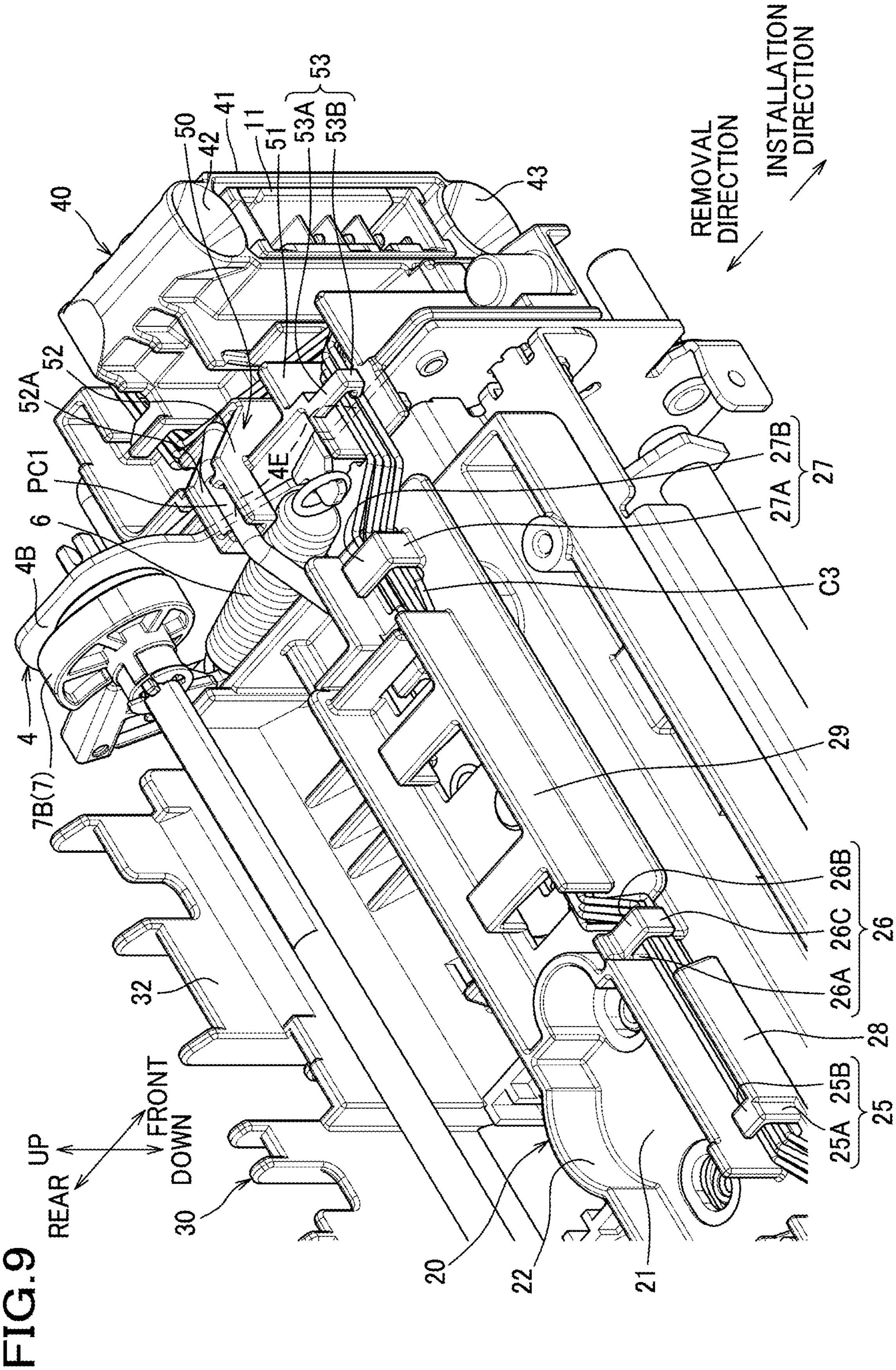
FIG. 9 is a partial enlarged view of an end on the other side in the longitudinal direction of the fixing device shown in FIG. 8.

As shown in FIGS. 7 to 9, the fixing device 1 further comprises a first cable holder 20 as a first frame and a rear guide 30 as a second frame.

As shown in FIG. 7, the rear guide 30 is a member that guides a sheet S ejected through between the heating roller 2 and the pressure roller 3. The rear guide 30 is made of plastic. The rear guide 30 includes a guide body 31 and a guide portion 32 extending upward from the guide body 31.

The guide body 31 extends in the longitudinal direction and in the installation direction to cover the connection frame 4C. The guide body 31 guides the first power cable PC1 from an end of the heater H on the one side in the longitudinal direction to the fixing connector 11. The guide body 31 includes a first retainer 33, a second retainer 34, a third retainer 35, a fourth retainer 36, a fifth retainer 37, a sixth retainer 38, and a first guide wall 39.

The first retainer 33 and the second retainer 34 hold the first power cable PC1. A plurality of the first retainers 33 are provided. In more detail, two first retainers 33 are provided on the one side in the longitudinal direction with respect to the longitudinal center CL1 of the heating roller 2 and one first retainer 33 is provided on the other side in the longitudinal direction with respect to the longitudinal center CL1 of the heating roller 2. Each first retainer 33 includes a pair of protrusions facing each other in the installation direction and protruding upward from the guide body 31. The first retainer 33 holds the first power cable PC1 between the pair of protrusions. The first retainer 33 restricts movement of the first power cable PC1 in the installation-removal direction.

The second retainer 34 is located between the fixing connector 11 and the first retainer 33 located on the other side in the longitudinal direction with respect to the longitudinal center CL1 of the heating roller 2. The second retainer 34 is an L-shaped element protruding upward from the guide body 31. The second retainer 34 includes an extending portion 34A and a hook portion 34B. The extending portion 34A extends upward from the guide body 31. The hook portion 34B extends in the removal direction from an upper end of the extending portion 34A. The second retainer 34 restricts movement of the first power cable PC1 in the upward direction and in the installation direction.

The third retainer 35, the fourth retainer 36 and the fifth retainer 37 hold the fourth cable C4 and the fifth cable C5. The third retainer 35 is located at a frontward side of an end of the guide body 31 on the one side in the longitudinal direction. The third retainer 35 includes a pair of protrusions protruding from the guide body 31 in the installation direction. The third retainer 35 holds the fourth cable C4 and the fifth cable C5 between the pair of protrusions. The third retainer 35 restricts movement of the fourth cable C4 and the fifth cable C5 in the longitudinal direction.

The fourth retainer 36 is located upward and on the other side in the longitudinal direction with respect to the third retainer 35. The fourth retainer 36 is an L-shaped element protruding upward from the guide body 31. The fourth retainer 36 includes an extending portion 36A and a hook portion 36B. The extending portion 36A extends upward from the guide body 31. The hook portion 36B extends in the installation direction from an upper end of the extending portion 36A. The fourth retainer 36 restricts movement of the fourth cable C4 and the fifth cable C5 in the upward direction.

The fifth retainer 37 is located on the other side in the longitudinal direction with respect to the fourth retainer 36. The fifth retainer 37 is an L-shaped element protruding from the guide body 31 in the installation direction. The fifth retainer 37 includes an extending portion 37A and a hook portion 37B. The extending portion 37A extends in the installation direction from the guide body 31. The hook portion 37B extends downward from a front end of the extending portion 37A. The fifth retainer 37 restricts movement of the fourth cable C4 and the fifth cable C5 in the upward direction and in the installation-removal direction.

The sixth retainer 38 holds the first cable C1 and the third cable C3. The sixth retainer 38 is located on the other side in the longitudinal direction with respect to the fifth retainer 37. The sixth retainer 38 is an L-shaped element protruding from the guide body 31 in the installation direction. The sixth retainer 38 includes an extending portion 38A and a hook portion 38B. The extending portion 38A extends in the installation direction from the guide body 31. The hook portion 38B extends downward from a front end of the extending portion 38A. The sixth retainer 38 restricts movement of the first cable C1 and the third cable C3 in the upward direction and in the installation-removal direction.

The first guide wall 39 guides the fourth cable C4 and the fifth cable C5 in the longitudinal direction between the fourth retainer 36 and the fifth retainer 37.

As shown in FIG. 8, the first cable holder 20 is a member that supports the intermediate circuit board 12. The first cable holder 20 is made of plastic. The first cable holder 20 includes a base wall 21, a lug 21A, a support wall 22, a seventh retainer 23, an eighth retainer 24, a ninth retainer 25, a tenth retainer 26, an eleventh retainer 27, a second guide wall 28 and a third guide wall 29.

The base wall 21 extends in the longitudinal direction and in the installation direction to cover a portion of the guide body 31 of the rear guide 30. The base wall 21 is opposed to the intermediate circuit board 12. The lug 21A extends upward from the base wall 21 toward the intermediate circuit board 12.

The support wall 22 extends upward from the base wall 21 toward the intermediate circuit board 12. The intermediate circuit board 12 is supported on an upper end of the support wall 22 (see also FIG. 10). An end of the intermediate circuit board 12 on the one side in the longitudinal direction is fixed to the first cable holder 20 by a screw or the like. An end of the intermediate circuit board 12 on the other side in the longitudinal direction is held on the first cable holder 20 by the lug 21A.

The seventh retainer 23 and the eighth retainer 24 hold the second cable C2. The seventh retainer 23 is located on a rearward side of an end of the base wall 21 on the one side in the longitudinal direction. The seventh retainer 23 is an L-shaped element protruding upward from the base wall 21. The seventh retainer 23 includes an extending portion 23A and a hook portion 23B. The extending portion 23A extends upward from the base wall 21. The hook portion 23B extends in the removal direction from an upper end of the extending portion 23A. The seventh retainer 23 restricts movement of the second cable C2 in the upward direction and in the installation direction.

The eighth retainer 24 is located frontward and on the other side in the longitudinal direction with respect to the seventh retainer 23. The eighth retainer 24 includes a pair of protrusions protruding upward from the base wall 21. The eighth retainer 24 holds the second cable C2 between the pair of protrusions. The eighth retainer 24 restricts movement of the second cable C2 in the installation-removal direction.

The ninth retainer 25, the tenth retainer 26 and the eleventh retainer 27 hold the third cable C3.

The ninth retainer 25 is located on the other side in the longitudinal direction with respect to the eighth retainer 24. As shown in FIG. 9, the ninth retainer 25 includes an extending portion 25A and a hook portion 25B. The extending portion 25A extends upward from the base wall 21. The hook portion 25B extends in the removal direction from an upper end of the extending portion 25A. The ninth retainer 25 restricts movement of the third cable C3 in the upward direction and in the installation direction.

The tenth retainer 26 is located on the other side in the longitudinal direction with respect to the ninth retainer 25. The tenth retainer 26 includes a first extending portion 26A, a second extending portion 26B and a hook portion 26C. The first extending portion 26A extends upward from the base wall 21. The second extending portion 26B extends in the installation direction from the first extending portion 26A. The hook portion 26C extends downward from a forward end of the second extending portion 26B. The tenth retainer 26 restricts movement of the third cable C3 in the upward direction and in the installation-removal direction.

The eleventh retainer 27 is located on the other side in the longitudinal direction with respect to the tenth retainer 26. The eleventh retainer 27 includes an extending portion 27A and a hook portion 27B. The extending portion 27A extends upward from the base wall 21. The hook portion 27B extends in the removal direction from the extending portion 27A. The eleventh retainer 27 restricts movement of the third cable C3 in the upward direction and in the installation direction.

The second guide wall 28 is located between the ninth retainer 25 and the tenth retainer 26 and guides the third cable C3 in the longitudinal direction.

The third guide wall 29 is located rearward of the second guide wall 28 and between the tenth retainer 26 and the eleventh retainer 27. The third guide wall 29 guides the third cable C3 in the longitudinal direction.

The fixing device 1 further comprises a connector holder 40. The connector holder 40 is a member that holds the fixing connector 11. The connector holder 40 includes a base portion 41, a first guide hole 42, a second guide hole 43 and a second cable holder 50.

The base portion 41 is located around the fixing connector 11 to hold the fixing connector 11. The first guide hole 42 and the second guide hole 43 are engaged with guide pins (not shown) of the housing connector 18 in a state where the fixing device 1 is installed in the main housing M.

The second cable holder 50 extends from one side to the other side of the second side frame 4B. The second side frame 4B has an edge 4E facing a direction perpendicular to the longitudinal direction (upward in this embodiment). The second cable holder 50 extends between the edge 4E of the second side frame 4B, and the third cable C3 and the first power cable PC1. The second cable holder 50 includes a holder body 51, a twelfth retainer 52 and a thirteenth retainer 53.

The twelfth retainer 52 holds the first power cable PC1. The twelfth retainer 52 is located on the other side in the longitudinal direction with respect to the second retainer 34 (see FIG. 7). The twelfth retainer 52 extends toward the one side in the longitudinal direction from the holder body 51. The twelfth retainer 52 has a groove 52A that guides the first power cable PC1. The twelfth retainer 52 restricts movement of the first power cable PC1 in the installation-removal direction.

The thirteenth retainer 53 holds the third cable C3. The thirteenth retainer 53 is located on the other side in the longitudinal direction with respect to the eleventh retainer 27. The thirteenth retainer 53 is an L-shaped element protruding in the installation direction from the holder body 51. The thirteenth retainer 53 includes an extending portion 53A and a hook portion 53B. The extending portion 53A extends in the installation direction from the holder body 51. The hook portion 53B extends downward from a front end of the extending portion 53A. The thirteenth retainer 53 restricts movement of the third cable C3 in the upward direction and in the installation-removal direction.

Figure 10:
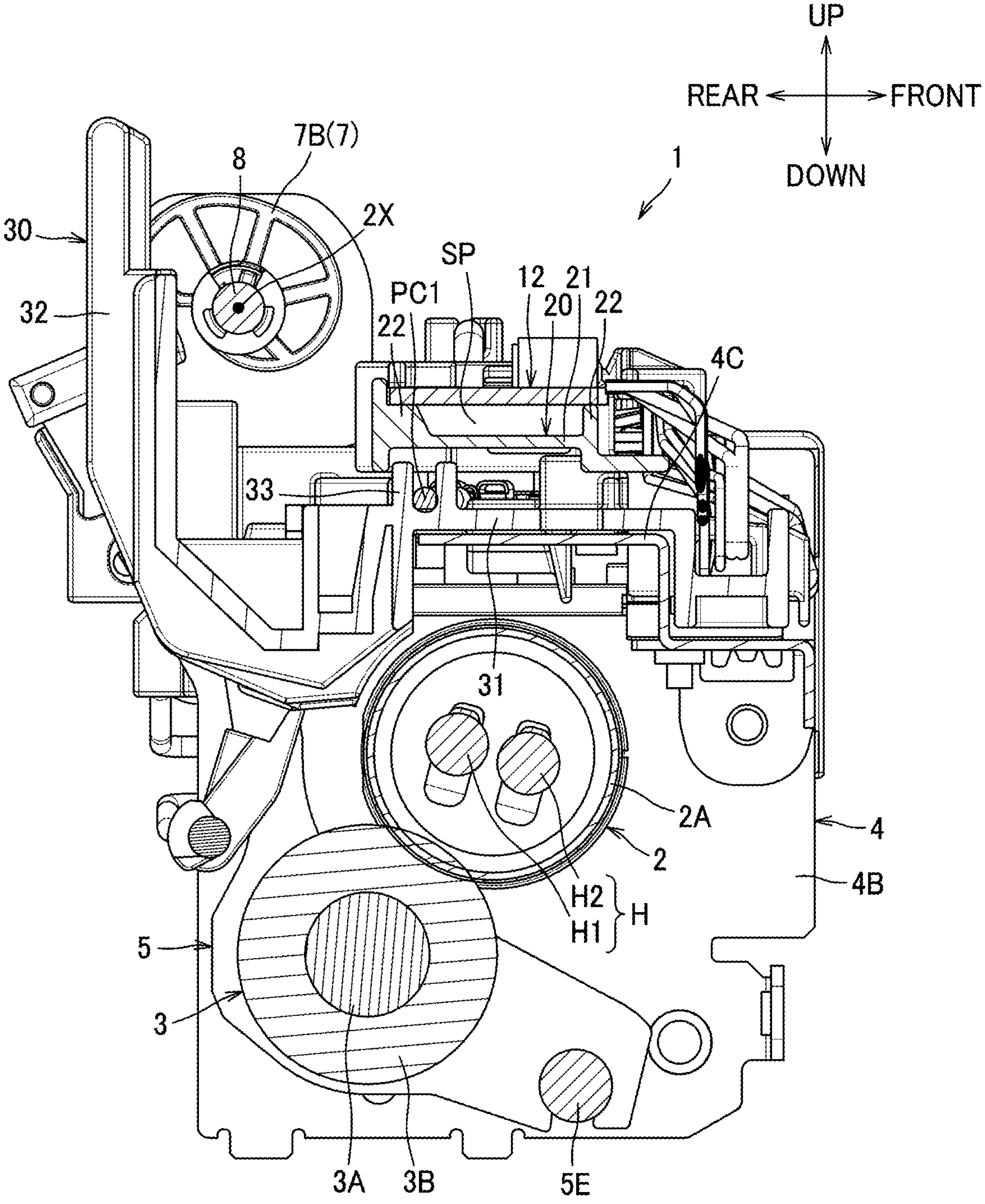
FIG. 10 is a sectional view taken along line A-A of FIG. 8.

As shown in FIG. 10, the intermediate circuit board 12 is located above the heating roller 2. The intermediate circuit board 12 is located on a side of the connection frame 4C opposite to a side of the connection frame 4C on which the heating roller 2 is located, i.e., the connection frame 4C is located between the intermediate circuit board 12 and the heating roller 2. The first cable holder 20 and the guide body 31 of the rear guide 30 are located between the intermediate circuit board 12 and the connection frame 4C in this order from the top. That is, the guide body 31 of the rear guide 30 is located between the first cable holder 20 and the connection frame 4C. The first power cable PC1 extends between the first cable holder 20 and the guide body 31 of the rear guide 30. The support wall 22 of the first cable holder 20 supports the intermediate circuit board 12 with a space SP being formed between the intermediate circuit board 12 and the base wall 21.

Figure 11:
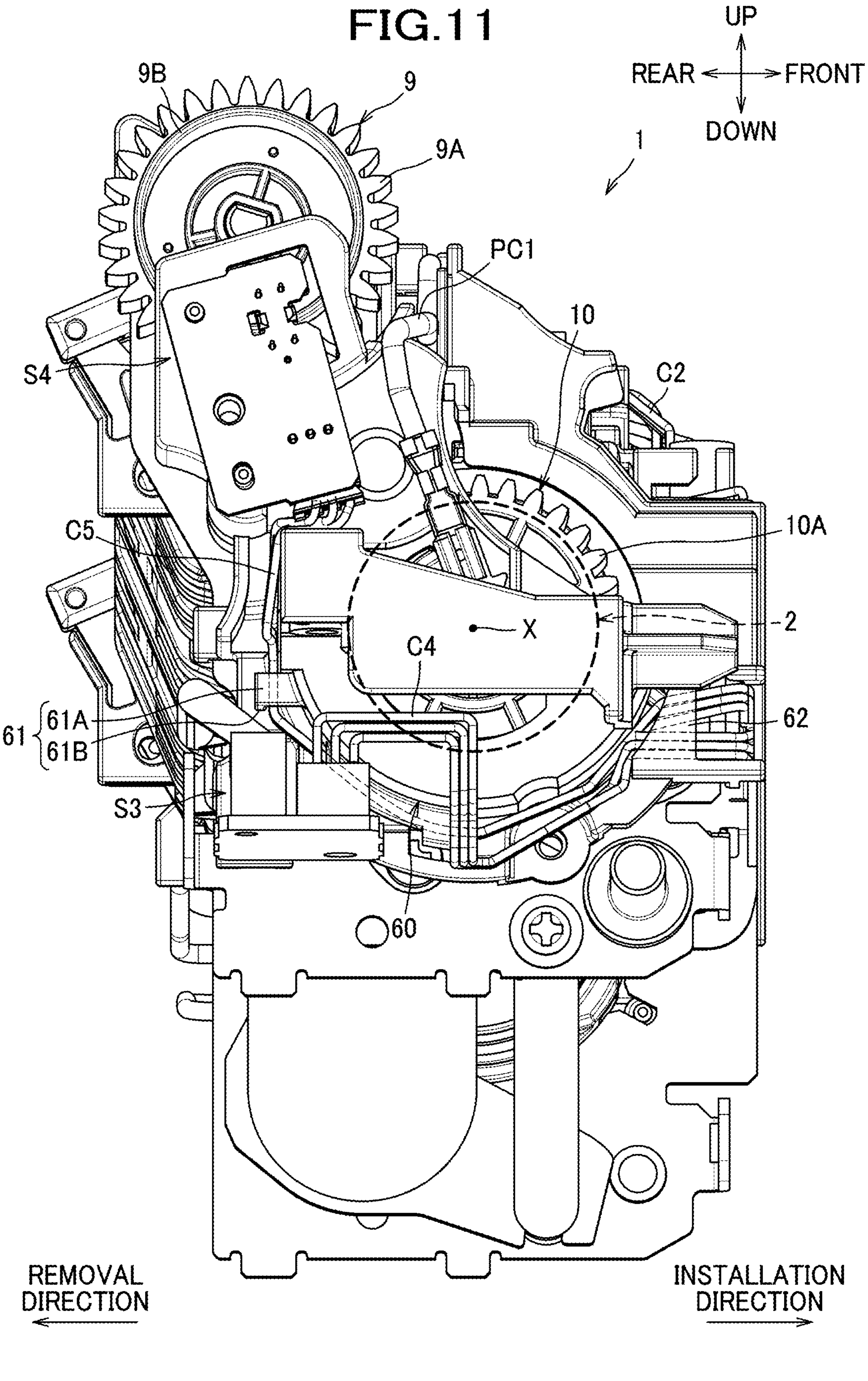
FIG. 11 is an illustration showing an end of the fixing device on one side in the longitudinal direction as viewed upward from below.

FIG. 11 is an illustration showing an end of the fixing device on the one side in the longitudinal direction viewed upward from below.

The fixing device 1 further comprises a gear cover 60 that covers part of the gear teeth 10A of the fixing gear 10. The gear cover 60 covers the gear teeth 10A on the bottom half of the fixing gear 10.

The gear cover 60 includes a fourteenth retainer 61, a fifteenth retainer 62 and a sixteenth retainer 63 (see FIG. 8).

The fourteenth retainer 61 holds the fifth cable C5. The fourteenth retainer 61 is located below the cam sensor S4. The fourteenth retainer 61 is an L-shaped element extending in the removal direction from the gear cover 60. The fourteenth retainer 61 includes an extending portion 61A and a hook portion 61B. The extending portion 61A extends in the removal direction from the gear cover 60. The hook portion 61B extends toward the other side in the longitudinal direction from a rear end of the extending portion 61A. The fourteenth retainer 61 restricts movement of the fifth cable C5 in the installation-removal direction and in the longitudinal direction.

The fifteenth retainer 62 and the sixteenth retainer 63 hold the fourth cable C4 and the fifth cable C5. The fifteenth retainer 62 is located frontward of the fourteenth retainer 61. The fifteenth retainer 62 is a plate-shaped element that covers the fourth cable C4 and the fifth cable C5 from the one side in the longitudinal direction. The fifteenth retainer 62 restricts movement of the fourth cable C4 and the fifth cable C5 in the longitudinal direction.

As shown in FIG. 8, the sixteenth retainer 63 is located on the other side in the longitudinal direction with respect to the fifteenth retainer 62. The sixteenth retainer 63 is an L-shaped element protruding toward the other side in the longitudinal direction from the gear cover 60. The sixteenth retainer 63 includes an extending portion 63A and a hook portion 63B.

The extending portion 63A extends toward the other side in the longitudinal direction from the gear cover 60. The hook portion 63B extends downward from a front end of the extending portion 63A. The sixteenth retainer 63 restricts movement of the fourth cable C4 and the fifth cable C5 in the upward direction and in the installation-removal direction.

Next, an example of a procedure for attaching the first power cable PC1 to the fixing device 1 will be described referring to FIGS. 7 and 9.

The first power cable PC1 has a first portion on the one side in the longitudinal direction connected to the heater H and a second portion on the other side in the longitudinal direction connected to the fixing connector 11. Upon attaching the first power cable PC1 to the fixing device 1, the first portion of the first power cable PC1 is drawn upward from the heater H and then in the longitudinal direction along the gear cover 60. The first portion of the first power cable PC1 is then drawn through between each of the pairs of protrusions of the two first retainers 33 located on the one side in the longitudinal direction and is connected to the thermostat TM. Next, the second portion of the first power cable PC1 is drawn rearward from the fixing connector 11 and then along the holder body 51 of the second cable holder 50 to place the second portion of the first power cable PC1 in the groove 52A of the twelfth retainer 52. The second portion of the first power cable PC1 is then hooked on the second retainer 34, drawn through the pair of protrusions of the first retainer 33 located on the other side in the longitudinal direction and connected to the thermostat TM.

Next, an example of a procedure for attaching the cables C1 to C5 to the fixing device 1 will be described referring to FIGS. 8, 9 and 11.

As shown in FIG. 8, upon attaching the first cable C1 to the fixing device 1, the first cable C1 is drawn upward from the first temperature sensor S1 and under the sixth retainer 38, and is connected to the first temperature connector CN4 of the intermediate circuit board 12.

Upon attaching the second cable C2 to the fixing device 1, the second cable C2 is drawn upward from the second temperature sensor S2 and is hooked on the seventh retainer 23. Subsequently, the second cable C2 is drawn through between the pair of protrusions of the eighth retainer 24 and is connected to the second temperature sensor connector CN1 of the intermediate circuit board 12.

Upon attaching the third cable C3 to the fixing device 1, the third cable C3 is drawn toward the one side in the longitudinal direction from the fixing connector 11 and around the holder body 51 of the second cable holder 50. Subsequently, the third cable C3 is drawn under the thirteenth retainer 53 and the eleventh retainer 27, along the rear surface of the third guide wall 29, under the tenth retainer 26 and the ninth retainer 25 and along the rear surface of the second guide wall 28. The third cable C3 is then drawn under the sixth retainer 38 and is connected to the relay connector CN5 of the intermediate circuit board 12.

Upon attaching the fourth cable C4 to the fixing device 1, the fourth cable C4 is drawn upward from the sheet sensor S3 and along an outer periphery of a portion of the gear cover 60 that covers the fixing gear 10 as shown in FIG. 11. The fourth cable C4 is then drawn through the fifteenth retainer 62 and the sixteenth retainer 63 as shown in FIG. 8 and then upward through between the pair of protrusions of the third retainer 35. Subsequently, the fourth cable C4 is drawn under the fourth retainer 36, along the rear surface of the first guide wall 39 and under the fifth retainer 37, and is connected to the sheet sensor connector CN2 of the intermediate circuit board 12.

As shown in FIG. 11, the cam sensor S4 is located above the heating roller 2. Upon attaching the fifth cable C5 to the fixing device 1, the fifth cable C5 is drawn downward from the cam sensor S4 and hooked on the fourteenth retainer 61. Next, the fifth cable C5 is drawn along the outer periphery of the portion of the gear cover 60 that covers the fixing gear 10, in such a manner that the fifth cable C5 extends under the heating roller 2. Then, as shown in FIG. 8, the fifth cable C5 is drawn through the fifteenth retainer 62, the sixteenth retainer 63, the third retainer 35, the fourth retainer 36 and the fifth retainer 37 in a similar manner as the fourth cable C4, and is connected to the cam sensor connector CN3 of the intermediate circuit board 12.

Figure 12:
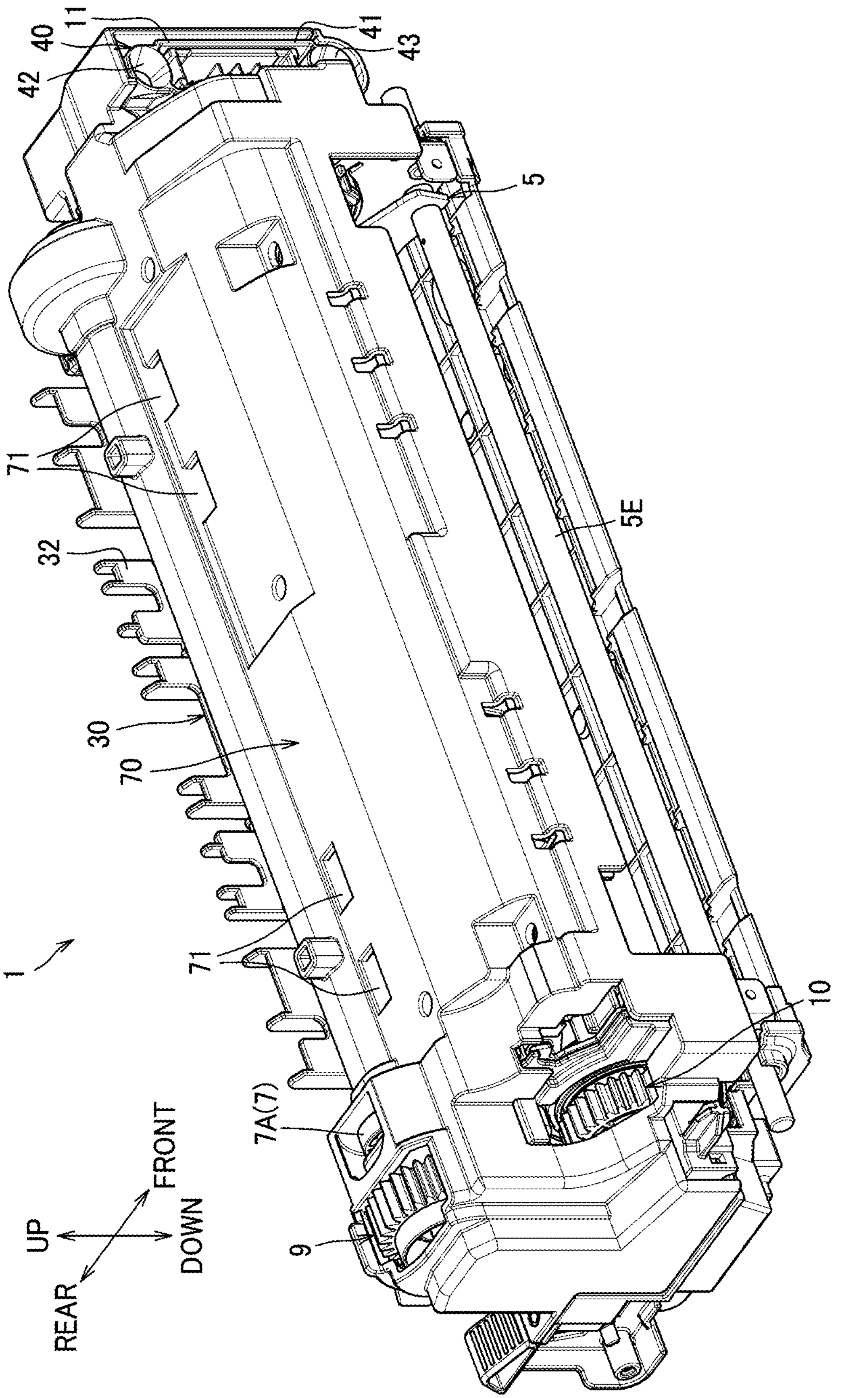
FIG. 12 is a perspective view showing a cover placed over the intermediate circuit board shown in FIG. 8.

As shown in FIG. 12, the fixing device 1 further comprises a cover 70 that covers the intermediate circuit board 12. The cover 70 has a plurality of vent holes 71 located above the intermediate circuit board 12.

The vent holes 71 allow air in the fixing device to be discharged.

Figure 13:
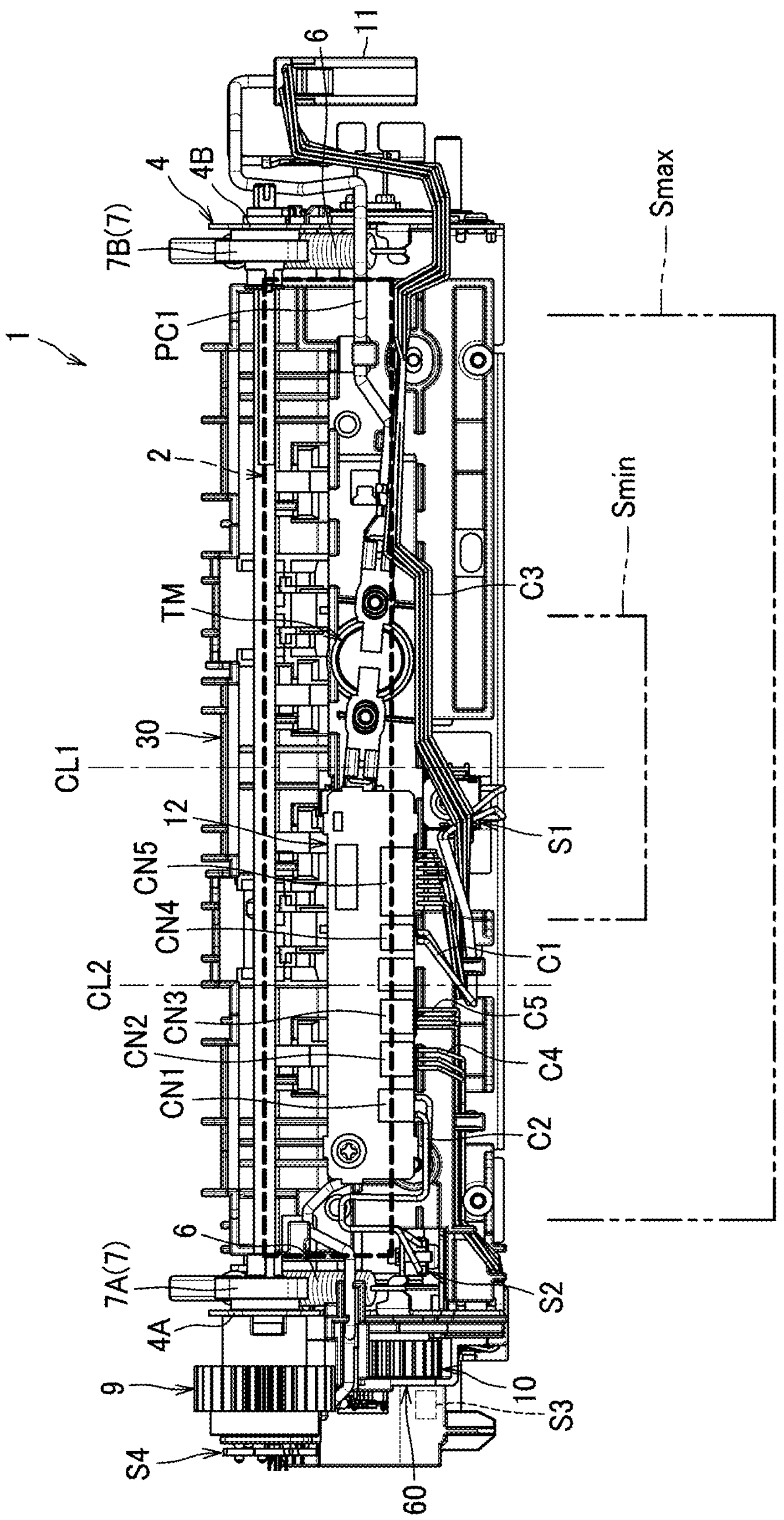
FIG. 13 is a plan view corresponding to FIG. 7.

As shown in FIG. 13, the first temperature sensor S1 is located on the one side in the longitudinal direction with respect to the longitudinal center CL1 of the heating roller 2 and detects a temperature of the heating roller 2 on the one side in the longitudinal direction with respect to the longitudinal center CL1 of the heating roller 2. The first temperature sensor S1 (a heat-sensitive element of the first temperature sensor S1) is located between one end and the other end of the intermediate circuit board 12 in the longitudinal direction. Further, the first temperature sensor S1 is located within a longitudinal area through which a sheet $S_{min}$ having a minimum width fixable in the fixing device passes when the sheet $S_{min}$ is placed in a centered position.

The second temperature sensor S2 is located on the one side in the longitudinal direction with respect to the longitudinal center CL1 of the heating roller 2 and detects a temperature of the heating roller 2 on the one side in the longitudinal direction with respect to the longitudinal center CL1 of the heating roller 2. The second temperature sensor S2 is located on the one side in the longitudinal direction with respect to an edge of the intermediate circuit board 12 on the one side in the longitudinal direction. Further, the second temperature sensor S2 is located outside the longitudinal area through which the sheet $S_{max}$ having a maximum width fixable in the fixing device passes.

The fixing connector 11 is located on the other side in the longitudinal direction with respect to the longitudinal center CL1 of the heating roller 2.

The sheet sensor S3 is located on the one side in the longitudinal direction with respect to the longitudinal center CL1 of the heating roller 2.

The cam sensor S4 is located on the one side in the longitudinal direction with respect to the longitudinal center CL1 of the heating roller 2.

A longitudinal center CL2 of the intermediate circuit board 12 is located on the one side in the longitudinal direction with respect to the longitudinal center CL1 of the heating roller 2. An edge of the intermediate circuit board 12 on the other side in the longitudinal direction is located on the one side in the longitudinal direction with respect to the longitudinal center CL1 of the heating roller 2. An edge of the intermediate circuit board 12 on the one side in the longitudinal direction is located closer, than an edge of the heating roller 2 on the one side in the longitudinal direction, to the longitudinal center CL1 of the heating roller 2.

The cam gear 9 is located on the one side in the longitudinal direction with respect to the longitudinal center CL1 of the heating roller 2.

Figure 14:
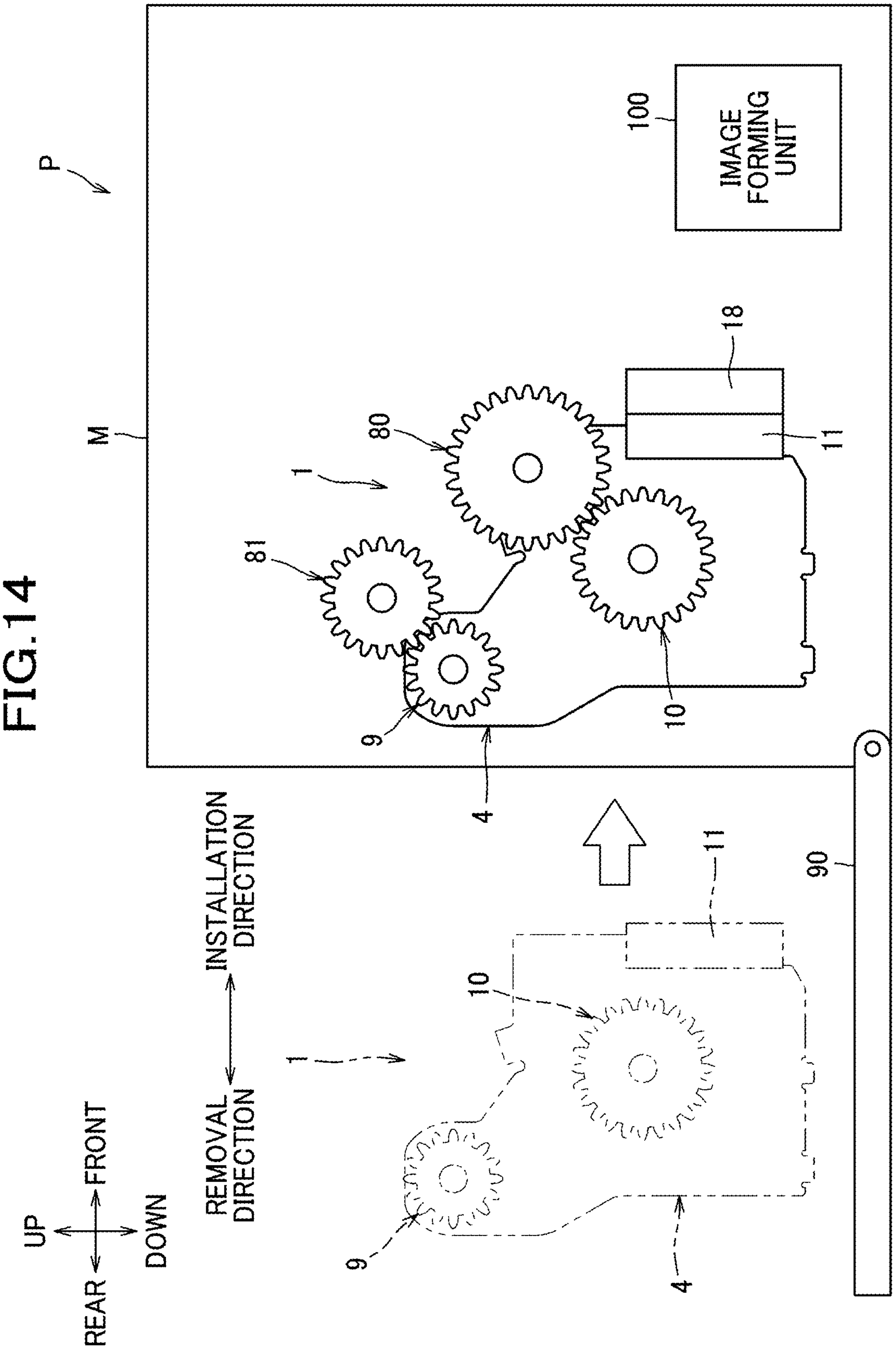
FIG. 14 is a schematic view showing engagement of gears and connection of connectors in a state where the fixing device is installed in the main housing of the image forming apparatus.

In FIG. 14, the fixing device 1 before installation into the main housing M is shown by dashed-double dotted lines and the fixing device 1 after installation into the main housing M is shown by solid lines. A fixing drive gear 80 and a cam drive gear 81 are further provided in the main housing M of the image forming apparatus P. The fixing drive gear 80 rotates when it receives a driving force from a motor (not shown). The fixing device 1 is installable into the main housing M when a cover 90 provided on a rear side of the main housing M is open. An image forming unit 100 that forms a toner image on a sheet is located inside the main housing M. The image forming unit 100 supplies a sheet with a toner image formed thereon to the fixing device 1.

In a state where the fixing device 1 is installed in the main housing M, the fixing gear 10 is meshed with the fixing drive gear 80 and rotates when it receives a driving force from the fixing drive gear 80. In a state where the fixing device 1 is installed in the main housing M, the cam gear 9 is meshed with the cam drive gear 81 and rotates when it receives a driving force from the cam drive gear 81.

According to the above, the following advantageous effects may be obtained by the present embodiment.

In the present embodiment, the first temperature sensor S1, the second temperature sensor S2, the sheet sensor S3, and the cam sensor S4, located on the one side in the longitudinal direction with respect to the longitudinal center CL1 of the heating roller 2, are respectively connected to the intermediate circuit board 12 by the first cable C1, the second cable C2, the fourth cable C4 and the fifth cable C5. Further, the intermediate circuit board 12 is connected to the fixing connector 11, located on the other side in the longitudinal direction with respect to the longitudinal center CL1 of the heating roller 2, by a third cable C3.

The cables C1 to C5 each include a plurality of signal lines. The number of signal lines included in the third cable C3 connecting the intermediate circuit board 12 and the fixing connector 11 is less than the total number of signal lines included in the first cable C1, the second cable C2, the fourth cable C4 and the fifth cable C5 connecting the first temperature sensor S1, the second temperature sensor S2, the sheet sensor S3, and the cam sensor S4 to the intermediate circuit board 12. This is because ground wires and the like can be shared. As a result, the wiring connecting the first temperature sensor S1, the second temperature sensor S2, the sheet sensor S3 and the cam sensor S4 to the fixing connector 11 in the fixing device 1 can be simplified.

The intermediate circuit board 12 is located on the one side in the longitudinal direction with respect the longitudinal center CL1 of to the heating roller 2; thus, the length of the first cable C1, the second cable C2, the fourth cable C4 and the fifth cable C5 which connect the first temperature sensor S1, the second temperature sensor S2, the sheet sensor S3 and the cam sensor S4 to the intermediate circuit board 12 can be made shorter.

The intermediate circuit board 12 is located above the heating roller 2; thus, the dimension of the fixing device 1 in the front-rear direction can be made smaller than that of a fixing device of an alternative configuration in which the intermediate circuit board 12 is located frontward or rearward of the heating roller 2.

Since the fixing connector 11 is located outside the pair of side frames 4A, 4B in the longitudinal direction, interference of the fixing connector 11 with the sheet S can be restrained.

The fixing gear 10 and the cam gear 9 are located on the one side in the longitudinal direction with respect to the heating roller 2, that is, on the side opposite to the fixing connector 11 in the longitudinal direction; thus, the fixing device 1 may be downsized. In addition, interference of the fixing gear 10 and the cam gear 9 with the fixing connector 11 can be restrained.

Since the pair of side frames 4A, 4B of the fixing device 1 is connected by the metal connection frame 4C, the rigidity of fixing device 1 may be increased.

The first cable holder 20 is provided between the intermediate circuit board 12 and the connection frame 4C; thus, the intermediate circuit board 12 is less susceptible to the heat from the heating roller 2 even if the intermediate circuit board 12 is located on the side of the connection frame 4C opposite to the side of the connection frame 4C on which the heating roller 2 is located.

The first cable holder 20 includes a base wall 21 and a support wall 22, and the support wall 22 supports the intermediate circuit board 12 with a space SP being formed between the intermediate circuit board 12 and the base wall 21; thus, a layer of air formed by the space SP can block the heat of the heating roller 2 from the intermediate circuit board 12.

The guide body 31 of the plastic rear guide 30 is provided between the first cable holder 20 and the connection frame 4C; thus, the first cable holder 20 and the guide body 31 can doubly block the heat of the heating roller 2 from the intermediate circuit board 12.

The fifth cable C5 connecting the cam sensor S4 and the intermediate circuit board 12 extends under the heating roller 2; thus, the fifth cable C5 is less susceptible to the heat from the heating roller 2. In addition, since the fifth cable C5 is held by the gear cover 60, contact of the fixing gear 10 with the fifth cable C5 can be restrained.

Since the first cable holder 20 holds the third cable C3, the third cable C3 can be protected from contact with the connection frame 4C.

The first power cable PC1 extends between the first cable holder 20 and the guide body 31 of the rear guide 30; thus, the first power cable PC1 can be protected from contact with the connection frame 4C.

The second cable holder 50 of the connector holder 40 extends between the edge 4E of the second side frame 4B facing the direction perpendicular to the longitudinal direction and the third cable C3; thus, the third cable C3 can be restrained from contacting the second side frame 4B.

The fixing device 1 is installable into and removable from the main housing M of the image forming apparatus P. Since the fixing device 1 comprises a cover 70 that covers the intermediate circuit board 12, the intermediate circuit board 12 can be protected from contact with other components inside the main housing M and from contact by a person when the fixing device 1 is being installed into or removed from the main housing M.

Since the cover 70 has vent holes 71 located above the intermediate circuit board 12, air heated by convection caused by a fan and other components located in the fixing device 1 can be discharged to the outside of the fixing device 1 through the vent holes 71.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the fixing device 1 is installable into and removable from the main housing M of the image forming apparatus P; however, the fixing device may be fixed to the main housing M such that it is not removable.

Although the heating roller 2 is adopted as the heating member in the above-described embodiment, the heating member may be, for example, a cylindrical fixing belt slidably supported by a guide.

In the above-described embodiment, the side frames 4A, 4B support the heating roller 2 in a manner that allows the heating roller 2 to rotate; however, the side frames 4A, 4B may support the pressure roller 3 in a manner that allows the pressure roller 3 to rotate.

In the above-described embodiment, the heating roller 2 is driven and the pressure roller 3 rotates in accordance with the heating roller 2; however, the pressure roller 3 may be driven and the heating roller 2 may rotate in accordance with the pressure roller 3. In this case, the fixing gear 10 is fixed to the pressure roller 3 and transmits a driving force to the pressure roller 3.

In the above-described embodiment, the pressure changing mechanism changes the nip pressure by moving the pressure roller 3 relative to the heating roller 2; however, the pressure changing mechanism may change the nip pressure by moving the heating roller 2 relative to the pressure roller 3. Alternatively, the fixing device 1 may not include the pressure changing mechanism.

Although a halogen heater is given as an example of the heater H in the above-described embodiment, the heater H may be a resistive heating element or an IH (induction heating) heat source and the like. Here, the IH heat source is a heat source that does not heat up itself, but heats the roller or the belt by magnetic induction heating. Although the fixing device 1 comprises two heaters H1, H2 in the above-described embodiment, the fixing device 1 may include one or more than two heaters H.

The elements described in the above embodiment and its modified examples may be implemented selectively and in combination.

What is claimed is:

1. A fixing device installable into a main housing of an image forming apparatus, comprising:

a heating member extending in a longitudinal direction and comprising a heater;

a pressure member extending in the longitudinal direction and configured to nip a sheet in combination with the heating member;

a first side frame located on one side in the longitudinal direction with respect to the heating member;

a second side frame located on another side in the longitudinal direction with respect to the heating member;

a connection frame extending in the longitudinal direction and connecting the first side frame and the second side frame;

an external connector connectable to the main housing;

a first temperature sensor configured to detect a temperature of the heating member;

a second temperature sensor configured to detect a temperature of the heating member;

an intermediate circuit board configured to relay a signal from the first temperature sensor to the external connector and to relay a signal from the second temperature sensor to the external connector;

a first cable configured to connect the first temperature sensor and the intermediate circuit board;

a second cable configured to connect the second temperature sensor and the intermediate circuit board; and a third cable configured to connect the intermediate circuit board and the external connector.

2. The fixing device according to claim 1, wherein the external connector is located on the another side in the longitudinal direction with respect to a longitudinal center of the heating member, and a longitudinal center of the intermediate circuit board is located on the one side in the longitudinal direction with respect to the longitudinal center of the heating member.

3. The fixing device according to claim 2, wherein an edge of the intermediate circuit board on the another side in the longitudinal direction is located on the one side in the longitudinal direction with respect to the longitudinal center of the heating member.

4. The fixing device according to claim 3, wherein an edge of the intermediate circuit board on the one side in the longitudinal direction is closer, than an edge of the heating member on the one side in the longitudinal direction, to the longitudinal center of the heating member.

5. The fixing device according to claim 2, wherein the first temperature sensor is located within a longitudinal area through which a sheet having a minimum width fixable in the fixing device passes, and the second temperature sensor is located outside a longitudinal area through which a sheet having a maximum width fixable in the fixing device passes.

6. The fixing device according to claim 2, wherein the first temperature sensor is located between one end and another end of the intermediate circuit board in the longitudinal direction, and the second temperature sensor is located on the one side in the longitudinal direction with respect to an edge of the intermediate circuit board on the one side in the longitudinal direction.

7. The fixing device according to claim 1, wherein the connection frame is made of metal and located between the intermediate circuit board and the heating member, and a first frame made of plastic is provided between the intermediate circuit board and the connection frame.

8. The fixing device according to claim 7, wherein the intermediate circuit board is located above the heating member.

9. The fixing device according to claim 8, wherein the first temperature sensor is located above the heating member.

10. The fixing device according to claim 7, wherein the first temperature sensor is held by the connection frame.

11. The fixing device according to claim 7, wherein the first frame comprises:

a base wall opposed to the intermediate circuit board; and a support wall extending from the base wall toward the intermediate circuit board to support the intermediate circuit board with a space being formed between the intermediate circuit board and the base wall.

12. The fixing device according to claim 7, wherein the first frame is configured to hold the third cable.

13. The fixing device according to claim 7, wherein a second frame made of plastic is provided between the first frame and the connection frame.

14. The fixing device according to claim 13, further comprising a first power cable configured to connect the external connector and one end of the heater on the one side in the longitudinal direction, wherein the external connector is located on the another side in the longitudinal direction with respect to a longitudinal center of the heating member, and the first power cable extends between the first frame and the second frame.

15. The fixing device according to claim 1, wherein the external connector is located outward of the second side frame in the longitudinal direction.

16. The fixing device according to claim 15, further comprising a connector holder configured to hold the external connector, wherein the connector holder extends from one side to another side of the second side frame in the longitudinal direction and includes a cable holder configured to hold the third cable.

17. The fixing device according to claim 1, further comprising a cover configured to cover the intermediate circuit board.

18. The fixing device according to claim 17, wherein the cover includes a vent hole located above the intermediate circuit board.

19. The fixing device according to claim 1, further comprising:

a sheet sensor located on the one side in the longitudinal direction with respect to a longitudinal center of the heating member and configured to detect a sheet that has passed through between the heating member and the pressure member; and a fourth cable configured to connect the sheet sensor and the intermediate circuit board.

20. The fixing device according to claim 1, further comprising:

a pressure changing mechanism comprising a cam and configured to change a nip pressure between the heating member and the pressure member;

a cam sensor located on the one side in the longitudinal direction with respect to a longitudinal center of the heating member and configured to detect a phase of the cam; and a fourth cable configured to connect the cam sensor and the intermediate circuit board.

* * * * *